Patented Oct. 24, 1950

2,527,322

UNITED STATES PATENT OFFICE 2,527,322

INSECT REPELLENT COMPOSITIONS

Glen H. Morey, Terre Haute, Ind., assignor to Commercial Solvents Corporation, Terre Haute, Ind., a corporation of Maryland No Drawing. Application July 21, 1945,
Serial No. 606,485

8 Claims. (Cl. 167—30)

This invention relates to new and useful insect controlling compositions, and more particularly to compositions adapted for repelling insects such as flies and the like, and containing as the active repellent ingredient a dialkylhexahydrophthalate wherein the alkyl group is methyl or ethyl, having the following formula:

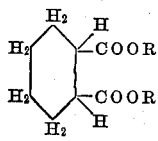

wherein the R substituents may be ethyl or methyl.

The dialkylhexahydrophthalates illustrated above may readily be prepared by the catalytic hydrogenation of the corresponding dialkylphthalate, for example by subjecting the dialkylphthalate to hydrogenation in the presence of Raney nickel catalyst at temperatures up to about 200° C. and about 1000 lb. per sq. in. pressure.

For certain purposes in controlling insects, it is often desirable to repel the insects without necessarily killing them. Such a situation exists where it is desired to protect cattle or other domestic animals which are kept out of doors or in unscreened areas, so that complete elimination of insects cannot be accomplished.

I have found that the dimethyl- and diethylhexahydrophthalates when mixed with a carrier and used to treat various materials exert a marked repellency toward insects, and particularly toward flies. Articles such as screens, fabrics, wood, glass, paper, etc., may readily be rendered insect repellent by applying thereto the compositions of my invention.

Any suitable carrier may be used, for example, alcohol, kerosene, "Ultrasene," or other petroleum distillates.

The quantity of dialkylhexahydrophthalate used in the composition will vary with the degree and duration of repellency required. I have found that at 25% concentration, surfaces treated with the composition will exert perfect repellency for approximately 8 hours, while at 50%, perfect repellency is maintained from 24 to 72 hours or more.

In applying my repellent compositions, I dissolve the dialkylhexahydrophthalate in a suitable solvent such as an alcohol or kerosene in the desired concentration and apply the solution to the surface to be protected, for example, by spraying, so as to apply a light, even coating or impregnation to the surface. As indicated above, surfaces so treated will remain completely repellent to flies for a period of several days, and will exert appreciable repellency for considerable periods thereafter.

To illustrate the efficacy of the compositions of my invention, the following tests were carried out.

Example

Twenty-five parts of dimethylhexahydrophthalate were dissolved in 100 parts of ethyl alcohol. Four strips of blotting paper measuring 1" x 3" were prepared by punching 5 holes $\tfrac{3}{16}$" in diameter, evenly spaced, in each strip. Two strips were sprayed with the dimethylhexahydrophthalate solution to secure a light, even impregnation of the blotting paper. The other two strips were not sprayed. The treated strips were allowed to dry and "age" for two hours.

At the end of the two hour aging period a treated strip and an untreated strip were stapled one inch apart on a square of waxed paper. A drop of malt extract as bait was placed in each hole in each strip. Each pair of strips, one treated with dimethylhexahydrophthalate, the other untreated, was placed under a hemispherical wire cage. Twenty flies were released into each cage, and after five minutes the number of flies feeding on each strip was noted. The strips were removed, and the test repeated at four, six, eight and ten hour intervals. Each test up to and including the eight hour test showed 100% repellency for the treated strip, after ten hours, 88% repellency.

A similar test was run using a solution containing 50 parts of dimethylhexahydrophthalate to 100 parts of alcohol for spraying the strips, with the result that the treated strips exerted 100% repellency for a period of 72 hours.

Another similar test carried out as above in which 50 parts of diethylhexahydrophthalate were dissolved in 100 parts of alcohol and used to spray the strips, imparted 100% repellency for a period of 24 hours.

The compositions of my invention may be used alone to repel insects, or they may be combined with other insect controlling compositions as desired.

While the above describes the preferred embodiments of my invention, it will be understood that departures may be made therefrom within the scope of the specification and claims.

What is claimed is:

1. An insect repellent composition comprising a solution in ethyl alcohol of from about 25 to 50 per cent of a dialkylhexahydrophthalate, wherein the alkyl groups are members selected from a class consisting of methyl and ethyl groups.

2. An insect repellent composition comprising from about 25 to 50 percent of a dialkylhexahydrophthalate, wherein the alkyl radicals are members selected from the group consisting of methyl and ethyl radicals, in ethyl alcohol.

3. An insect repellent composition comprising from about 25 to 50 per cent of dimethylhexahydrophthalate in ethyl alcohol.

4. An insect repellent composition comprising from about 25 to 50 per cent of diethylhexahydrophthalate in ethyl alcohol.

5. An insect repellent composition comprising from about 25 to 50 per cent of a dialkylhexahydrophthalate, wherein the alkyl radicals are members selected from the group consisting of methyl and ethyl radicals, and a liquid carrier selected from the group consisting of ethyl alcohol and kerosene.

6. The composition of claim 5 wherein the carrier is kerosene.

7. An insect repellent composition comprising from about 25 to 50 per cent of dimethylhexahydrophthalate in kerosene.

8. An insect repellent composition comprising from about 25 to 50 per cent of diethylhexahydrophthalate in kerosene.

GLEN H. MOREY.

REFERENCES CITED

The following references are of record in the file of this patent:

UNITED STATES PATENTS

| Number | Name | Date |
|---|---|---|
| 1,727,305 | Moore | Sept. 3, 1929 |
| 2,217,673 | Coleman | Oct. 15, 1940 |
| 2,237,356 | Merrill | Apr. 8, 1941 |
| 2,384,955 | Moyle | Sept. 18, 1945 |

OTHER REFERENCES

Dictionary of Organic Compounds, by Heilbron, 1936 ed., vol. 2, page 172.

Beilstein, "Handbuch der Organischen Chemie," 4th ed., vol. 9, pp. 731, 732. (Copy in Pat. Off. Sci. Lib.)

OSRD Committee on Medical Research, Insect Control Committee Report No. 16, Interim Report No. O-87, Feb. 1, 1945; particularly pages 73 and 95, Orlando Nos. O-3896 and O-3897.